United States Patent
Li et al.

(10) Patent No.: US 12,136,714 B2
(45) Date of Patent: Nov. 5, 2024

(54) METHOD FOR SELECTIVELY EXTRACTING LITHIUM FROM RETIRED BATTERY AND APPLICATION OF METHOD

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Bo Li, Guangdong (CN); Changdong Li, Guangdong (CN); Dingshan Ruan, Guangdong (CN); Ruokui Chen, Guangdong (CN); Yanchao Qiao, Guangdong (CN); Donglian Bao, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp Ev Recycling Co., Ltd., Hunan (CN)

( * ) Notice: Subject to any disclaimer, the term of this patent is extended or adjusted under 35 U.S.C. 154(b) by 0 days.

(21) Appl. No.: 18/260,236

(22) PCT Filed: Jun. 6, 2022

(86) PCT No.: PCT/CN2022/097178
§ 371 (c)(1),
(2) Date: Jun. 30, 2023

(87) PCT Pub. No.: WO2023/000843
PCT Pub. Date: Jan. 26, 2023

(65) Prior Publication Data
US 2024/0039068 A1  Feb. 1, 2024

(30) Foreign Application Priority Data

Jul. 22, 2021 (CN) .......................... 202110831643.0

(51) Int. Cl.
| | |
|---|---|
| *H01M 10/54* | (2006.01) |
| *C22B 1/02* | (2006.01) |
| *C22B 1/24* | (2006.01) |
| *C22B 7/00* | (2006.01) |
| *C22B 26/12* | (2006.01) |

(52) U.S. Cl.
CPC .............. *H01M 10/54* (2013.01); *C22B 1/02* (2013.01); *C22B 1/24* (2013.01); *C22B 7/007* (2013.01); *C22B 26/12* (2013.01)

(58) Field of Classification Search
CPC .......... H01M 4/50; H01M 10/54; H01M 4/02; Y02E 60/10; C22B 1/24; C22B 1/02; C22B 7/007; C22B 26/12
See application file for complete search history.

(56) References Cited

FOREIGN PATENT DOCUMENTS

| | | | | |
|---|---|---|---|---|
| CN | 102544475 A | | 7/2012 | |
| CN | 103633392 A | * | 3/2014 | ............ H01M 10/54 |

(Continued)

OTHER PUBLICATIONS

Wang, Method of Lithium Ion Battery Anode Material Lithium Manganate From Recycling Lead-zinc Containing Waste Manganese Lithium, Aug. 2016, See the Abstract. (Year: 2016).*

(Continued)

*Primary Examiner* — Anca Eoff
*Assistant Examiner* — Monique M Wills
(74) *Attorney, Agent, or Firm* — ArentFox Schiff LLP

(57) ABSTRACT

Disclosed are a method for selectively extracting lithium from a retired battery and an application of the method. According to the method, on the basis of an ion exchange effect between a divalent manganese ion and a lithium ion, a positive electrode material and a divalent manganese salt (Continued)

are mixed according to a certain proportion and prepared into a slurry, and the divalent manganese salt and the positive electrode material are fully mixed by means of a ball milling process, such that a lattice structure of the positive electrode material is effectively damaged, thereby reducing activation energy of exchange of the divalent manganese ion and the lithium ion and greatly reducing reaction energy required by a subsequence lithium extraction process. A mixed material after ball milling is roasted at a lower temperature such that the bivalent manganese in the manganese salt occupies a lithium position in a layered structure, and manganese-lithium replacement is directly performed to obtain a pure lithium-containing leaching solution. The present method greatly improves the leaching rate and selectivity of lithium. The present invention uses a mode of first performing ball-mill mixing and then performing roasting, and thus has low power consumption, high safety, good leaching rate and selectivity of lithium, and wide application prospects.

5 Claims, 2 Drawing Sheets

(56) References Cited

FOREIGN PATENT DOCUMENTS

| | | | | | |
|---|---|---|---|---|---|
| CN | 105826630 | A | * | 8/2016 | |
| CN | 105838895 | A | | 8/2016 | |
| CN | 108767354 | A | | 11/2018 | |
| CN | 109913637 | A | | 6/2019 | |
| CN | 110760686 | A | | 2/2020 | |
| CN | 110835683 | A | | 2/2020 | |
| CN | 110938743 | A | | 3/2020 | |
| CN | 111170343 | A | | 5/2020 | |
| CN | 111733328 | A | | 10/2020 | |
| CN | 111807388 | A | | 10/2020 | |
| CN | 111926191 | A | | 11/2020 | |
| CN | 112652807 | A | | 4/2021 | |
| CN | 113684374 | A | | 11/2021 | |
| JP | H0517832 | A | | 1/1993 | |
| JP | 2010198916 | A | * | 9/2010 | ........ H01M 10/0525 |
| JP | 2018026279 | A | | 2/2018 | |
| JP | 6647667 | B1 | | 2/2020 | |
| JP | 2021014630 | A | | 2/2021 | |

OTHER PUBLICATIONS

Xie et al., A Method of Preparing Nickel Manganese Hydroxide by Waste Power Battery Orientation Cycle, Mar. 2014, See the Abstract. (Year: 2014).*

Iwanaga et al., Nonaqueous Electrolyte Secondary Battery, Sep. 2010, See the Abstract. (Year: 2010).*

International Search Report in PCT/CN2022/097178, mailed Aug. 26, 2022, 6 pages.

Search Report and Written Opinion dated May 10, 2024 from corresponding Spanish Application No. 202390088.

* cited by examiner

METHOD FOR SELECTIVELY EXTRACTING LITHIUM FROM RETIRED BATTERY AND APPLICATION OF METHOD

CROSS REFERENCE TO RELATED APPLICATION(S)

This application is a National Phase entry of PCT Application No. PCT/CN2022/097178, entitled "METHOD FOR SELECTIVELY EXTRACTING LITHIUM FROM RETIRED BATTERY AND APPLICATION OF METHOD" and filed on Jun. 6, 2022, which claims priority of Chinese Application No. 202110831643.0 entitled "METHOD FOR SELECTIVELY EXTRACTING LITHIUM FROM RETIRED BATTERY AND APPLICATION OF METHOD" and filed on Jul. 22, 2021, both of which are expressly incorporated by reference herein in their entirety.

TECHNICAL FIELD

The present disclosure relates to the technical field of recovery of retired batteries, and specifically relates to a method for selectively extracting lithium from a retired battery and use thereof.

BACKGROUND

As the goal of carbon neutrality is increasingly approaching, the new energy resource market is booming and the prospect thereof is unlimited. Lithium-ion battery is outstanding in the current energy resource market. However, the lifespan of lithium-ion batteries is only 3 to 5 years. As more and more lithium batteries enter an obsolescence period, reasonable and effective disposal of retired batteries has become an inevitable requirement for environmental protection and sustainable resource development.

At present, recovery methods of the retired lithium batteries are mainly divided into a wet route and a pyrogenic route. However, whether it is a hydrometallurgy or a pyrometallurgy, valuable metals such as nickel, cobalt, manganese, and the like in batteries are recovered in a concentrated and preferential manner, and the lithium with a lower content is often disposed at the end of the process, resulting in a serious lithium loss and an extremely low recovery rate. Therefore, how to selectively extract lithium from retired batteries has become an urgent problem to be solved in this field. The technical routes currently studied include: carbon reduction, aluminothermic reduction, sulfate roasting, high temperature and high pressure acid leaching, high temperature and high pressure ion exchange, etc. However, whether it is carbon reduction or aluminothermic reduction, the leaching rate is low, and the sulfate roasting process will release a large amount of toxic and harmful gases, whereas the high temperature and high pressure acid leaching and the ion exchange both have low selectivity, higher pressure, difficulty in industrialization and other issues.

SUMMARY

The present disclosure aims to at least solve one of the above-mentioned technical problems existing in the prior art. Accordingly, the present disclosure proposes a method for selectively extracting lithium from a retired battery and use thereof. The method has a low energy consumption, a high safety, and an excellent leaching rate and selectivity of lithium.

According to one aspect of the present disclosure, a method for selectively extracting lithium from a retired battery is proposed, which includes the following steps:

S1: mixing a lithium battery positive electrode material and a manganous salt, adding a solvent to prepare a slurry, and ball milling the slurry to obtain a ball milled mixed material;

S2: calcining the ball milled mixed material to obtain a calcined product; and

S3: adding the calcined product into a leaching agent for leaching to obtain a lithium-rich leaching solution.

Wherein, the positive electrode material has a layered structure.

In some embodiments of the present disclosure, in step S1, the retired battery is at least one of lithium manganate, lithium cobaltate, lithium nickel cobalt manganate, or lithium nickel cobalt aluminate batteries.

In some embodiments of the present disclosure, in step S2, the solvent is at least one of water, hydrochloric acid solution, sulfuric acid solution, manganese nitrate solution, or manganese sulfate solution.

In some preferred embodiments of the present disclosure, the solvent is water.

In some embodiments of the present disclosure, in step S2, a solid-to-liquid ratio of the slurry is 500 g/L to 5000 g/L.

In some embodiments of the present disclosure, a solid-to-liquid ratio of the slurry is 800 g/L to 2000 g/L.

In some embodiments of the present disclosure, in step S2, the manganous salt is at least one of manganous sulfate, manganous chloride, manganous nitrate, manganous phosphate, manganous acetate, manganous oxalate, or manganous acetylacetonate.

In some embodiments of the present disclosure, in step S2, a molar ratio of manganese ions in the manganous salt to lithium ions in the positive electrode material is (0.1-2):1.

In some preferred embodiments of the present disclosure, a molar ratio of manganese ions in the manganous salt to lithium ions in the positive electrode material is (0.4-0.6):1.

In some embodiments of the present disclosure, in step S2, a ball-to-material ratio of the ball milling is (1-100):1, a rotation speed of the ball milling is 200 rpm to 1200 rpm, and a time for the ball milling is 0.5 h to 8 h.

In some preferred embodiments of the present disclosure, a ball-to-material ratio of the ball milling is (2-10):1, a rotation speed of the ball milling is 300 rpm to 600 rpm, and a time for the ball milling is 1 h to 5 h.

In some embodiments of the present disclosure, in step S3, a temperature of the calcining is 200° C. to 800° C., a heating rate is 1° C./min to 20° C./min, and a time for the calcining is 1 h to 12 h.

In some preferred embodiments of the present disclosure, a temperature of the calcining is 200° C. to 400° C., a heating rate is 2° C./min to 8° C./min, and a time for the calcining is 2 h to 4 h.

In some embodiments of the present disclosure, in step S4, the leaching agent is at least one of water, carbonic acid solution, sulfuric acid solution, hydrochloric acid solution, or sodium hydroxide solution.

In some preferred embodiments of the present disclosure, the leaching agent is water.

In some embodiments of the present disclosure, in step S4, a solid-to-liquid ratio of the calcined product to the leaching agent is 100 g/L to 800 g/L.

The present disclosure also proposes a use of the above-mentioned method in a preparation of a lithium salt.

A preferred embodiment of the present disclosure has at least the following beneficial effects.

In the present disclosure, based on an ion exchange effect between manganous ions and lithium ions, the positive electrode material and the manganous salt are mixed in a certain ratio to prepare a slurry, and the manganous salt and the positive electrode material are thoroughly mixed by a ball milling process, effectively destroying the lattice structure of the positive electrode material, thereby reducing an activation energy of the exchange of manganous ions and lithium ions, and greatly reducing the reaction energy required for a subsequent lithium extraction process. The ball milled mixed material is calcined at a lower temperature, such that the bivalent manganese of the manganous salt occupies the position of lithium in the layered structure to directly perform a manganese-lithium replacement, and finally, a pure lithium-containing leachate is obtained. This method greatly improves the leaching rate and selectivity of lithium. The present disclosure adopts the method of ball milling the mixed material and then calcining, which has a low energy consumption, a high safety, and an excellent leaching rate and selectivity of lithium, and has a great application prospect.

BRIEF DESCRIPTION OF THE DRAWINGS

The present disclosure will be further described in details accompanying with the accompanying drawings and examples.

DETAILED DESCRIPTION OF THE EMBODIMENTS

Hereinafter, the concept of the present disclosure and the technical effects produced will be described clearly and completely with reference to the examples, so as to fully understand the purpose, features and effects of the present disclosure. It is apparent that the described examples are only a part of the examples of the present disclosure, and not all of the examples, and other examples obtained by those skilled in the art based on the examples of the present disclosure without creative efforts fall within the protection scope of the present disclosure.

Example 1

Figure 1:
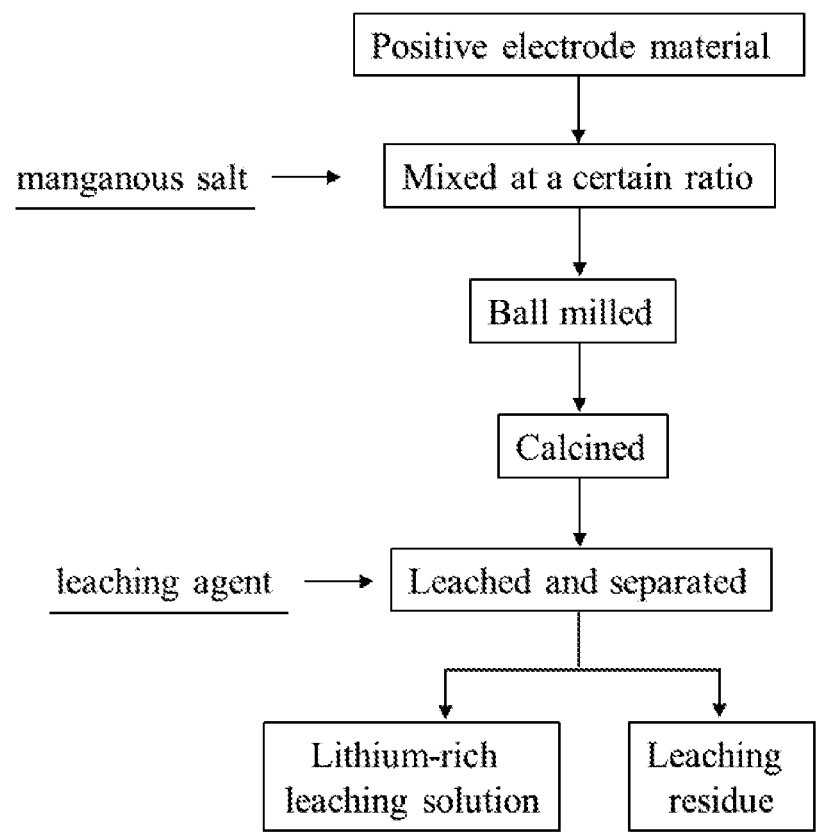
FIG. 1 is a process flow chart of Example 1 of the present disclosure.

A method for selectively extracting lithium from a retired 111-type lithium nickel cobalt manganate battery is provided. Referring to FIG. 1, the specific processes were as follows.

At S1, the retired 111-type lithium nickel cobalt manganate battery was placed in a saturated brine for discharging, a positive electrode sheet was disassembled and separated and then dried, and the positive electrode sheet was crushed and sieved to obtain a 111-type lithium nickel cobalt manganate positive electrode material.

At S2, 5 g of the positive electrode material and manganous chloride were mixed at a molar ratio of lithium ions to manganese ions of 2:1, and deionized water was added at a solid-to-liquid ratio of 1000 g/L. After thoroughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of at 250° C. for 5 h to obtain a calcined product.

At S4, the calcined product was mixed with deionized water at a solid-to-liquid ratio of 200 g/L, and stirred for 30 min, then filtered and washed to obtain 0.055 L of lithium-rich leaching solution and 6.22 g of leaching residue. The lithium-rich leaching solution had a lithium concentration of 5.40 g/L, a nickel concentration of 0.017 g/L, and a manganese concentration of g/L. No cobalt and aluminum had been detected.

Figure 2:
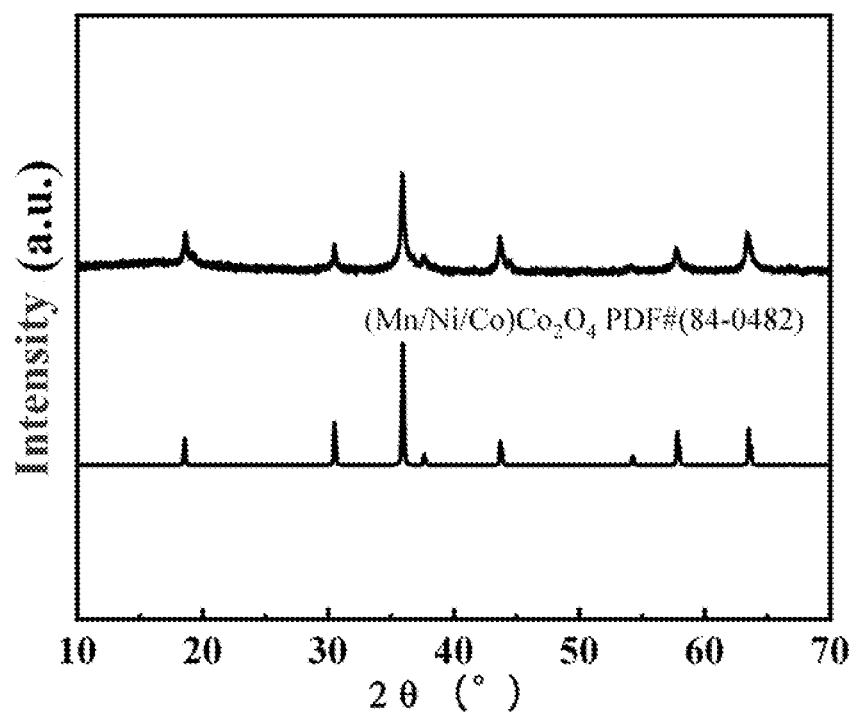
FIG. 2 is an X-Ray Diffraction (XRD) of a leaching residue of Example 1 of the present disclosure.

The positive electrode material and the leaching residue in this example were detected by an inductively coupled plasma optical emission spectrometer (ICP-OES) and an atomic absorption spectrophotometer. The detection result was shown in Table 1. Wherein, the leaching rate of lithium=(volume of leaching solution*lithium concentration)/(mass of leaching material*lithium content)*100%, the selectivity of lithium=(volume of leaching solution*lithium concentration)/(volume of leaching solution*(lithium concentration+nickel concentration+cobalt concentration+manganese concentration+aluminum concentration))*100%, the leaching rate of lithium in step S4 was calculated to be 95.6%, and the selectivity was 99.5%. The lithium-rich leaching solution can be used to prepare various lithium salts after being enriched. The leaching residue in step S4 was analyzed by an X-ray diffractometer (XRD). The result was shown in FIG. 2, the main phases were oxides of nickel, cobalt, and manganese. The leaching residue can be used to prepare various transition metal salts after being acid dissolved and separated.

TABLE 1

| Composition of positive electrode material and leaching residue of Example 1 | | | | | |
|---|---|---|---|---|---|
| Element | Li | Ni | Co | Mn | Al |
| Positive electrode material % | 6.21 | 18.91 | 17.12 | 18.11 | 0.81 |
| Leaching residue % | 0.15 | 15.31 | 14.98 | 35.23 | 0.66 |

Example 2

A method for selectively extracting lithium from a retired 523-type lithium nickel cobalt manganate battery is provided, the specific processes were as follows:

At S1, the retired 523-type lithium nickel cobalt manganate battery was placed in a saturated brine for discharging, a positive electrode sheet was disassembled and separated and then dried, and the positive electrode sheet was crushed and sieved to obtain a 523-type lithium nickel cobalt manganate positive electrode material.

At S2, 5 g of the positive electrode material and manganous nitrate were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of at 250° C. for 5 h to obtain a calcined product.

At S4, the calcined product was mixed with deionized water at a solid-to-liquid ratio of 200 g/L, and stirred for 30 min, then filtered and washed to obtain 0.060 L of lithium-rich leaching solution and 6.34 g of leaching residue. The lithium-rich leaching solution had a lithium concentration of 5.54 g/L, a nickel concentration of 0.032 g/L, and a manganese concentration of g/L. No cobalt and aluminum had been detected.

The positive electrode material and the leaching residue in this example were detected by an inductively coupled plasma optical emission spectrometer (ICP-OES) and an atomic absorption spectrophotometer. The detection result was shown in Table 2. Wherein, the leaching rate of lithium=(volume of leaching solution*lithium concentration)/(mass of leaching material*lithium content)*100%, the selectivity of lithium=(volume of leaching solution*lithium concentration)/(volume of leaching solution*(lithium concentration+nickel concentration+cobalt concentration+manganese concentration+aluminum concentration))*100%, the leaching rate of lithium in step S4 was calculated to be 94.7%, and the selectivity was 98.7%. The lithium-rich leaching solution can be used to prepare various lithium salts after being enriched. The leaching residue in step S4 was analyzed by an X-ray diffractometer (XRD), and the main phases were oxides of nickel, cobalt, and manganese. The leaching residue can be used to prepare various transition metal salts after being acid dissolved and separated.

TABLE 2

Composition of positive electrode material and leaching residue of Example 2

| Element | Li | Ni | Co | Mn | Al |
| --- | --- | --- | --- | --- | --- |
| Positive electrode material % | 7.02 | 31.56 | 10.34 | 11.28 | 0.56 |
| Leaching residue % | 0.28 | 25.34 | 8.59 | 29.04 | 0.37 |

Example 3

A method for selectively extracting lithium from a retired 811-type lithium nickel cobalt manganate battery, the specific processes were as follows:

At S1, the retired 811-type lithium nickel cobalt manganate battery was placed in a saturated brine for discharging, a positive electrode sheet was disassembled and separated and then dried, and the positive electrode sheet was crushed and sieved to obtain a 811-type lithium nickel cobalt manganate positive electrode material.

At S2, 5 g of the positive electrode material and manganous sulfate were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of at 250° C. for 5 h to obtain a calcined product.

At S4, the calcined product was mixed with deionized water at a solid-to-liquid ratio of 200 g/L, and stirred for 30 min, then filtered and washed to obtain 0.056 L of lithium-rich leaching solution and 6.37 g of leaching residue. The lithium-rich leaching solution had a lithium concentration of 5.92 g/L, a nickel concentration of 0.032 g/L, and a manganese concentration of g/L. No cobalt and aluminum had been detected.

The positive electrode material and the leaching residue in this example were detected by an inductively coupled plasma optical emission spectrometer (ICP-OES) and an atomic absorption spectrophotometer. The detection result was shown in Table 3. Wherein, the leaching rate of lithium=(volume of leaching solution*lithium concentration)/(mass of leaching material*lithium content)*100%, the selectivity of lithium=(volume of leaching solution*lithium concentration)/(volume of leaching solution*(lithium concentration+nickel concentration+cobalt concentration+manganese concentration+aluminum concentration))*100%, the leaching rate of lithium in step S4 was calculated to be 92.1%, and the selectivity of lithium was 98.1%. The lithium-rich leaching solution can be used to prepare various lithium salts after being enriched. The leaching residue in step S4 was analyzed by an X-ray diffractometer (XRD), and the main phases were oxides of nickel, cobalt, and manganese. The leaching residue can be used to prepare various transition metal salts after being acid dissolved and separated.

TABLE 3

Composition of positive electrode material and leaching residue of Example 3

| Element | Li | Ni | Co | Mn | Al |
| --- | --- | --- | --- | --- | --- |
| Positive electrode material % | 7.20 | 39.58 | 5.08 | 4.97 | 0.69 |
| Leaching residue % | 0.45 | 30.10 | 4.15 | 25.39 | 0.51 |

Example 4

A method for selectively extracting lithium from a retired lithium cobaltate battery, the specific processes were as follows:

At S1, the retired lithium cobaltate battery was placed in a saturated brine for discharging, a positive electrode sheet was disassembled and separated and then dried, and the positive electrode sheet was crushed and sieved to obtain a lithium cobaltate positive electrode material.

At S2, 5 g of the positive electrode material and manganous chloride were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of at 250° C. for 5 h to obtain a calcined product.

At S4, the calcined product was mixed with deionized water at a solid-to-liquid ratio of 200 g/L, and stirred for 30 min, then filtered and washed to obtain 0.062 L of lithium-rich leaching solution and 6.64 g of leaching residue. The lithium-rich leaching solution had a lithium concentration of 5.33 g/L, a cobalt concentration of 0.085 g/L, and a manganese concentration of g/L. No nickel and aluminum had been detected.

The positive electrode material and the leaching residue in this example were detected by an inductively coupled plasma optical emission spectrometer (ICP-OES) and an atomic absorption spectrophotometer. The detection result was shown in Table 4. Wherein, the leaching rate of lithium=(volume of leaching solution*lithium concentration)/(mass of leaching material*lithium content)*100%, the selectivity of lithium=(volume of leaching solution*lithium concentration)/(volume of leaching solution*(lithium concentration+nickel concentration+cobalt concentration+manganese concentration+aluminum concentration))*100%, the leaching rate of lithium in step S4 was calculated to be 94.7%, and the selectivity of lithium was 97.8%. The lithium-rich leaching solution can be used to prepare various lithium salts after being enriched. The leaching residue in step S4 was analyzed by an X-ray diffractometer (XRD), and the main phases were oxides of cobalt. The leaching residue can be used to prepare various transition metal salts after being acid dissolved and separated.

TABLE 4

Composition of positive electrode material and leaching residue of Example 4

| Element | Li | Ni | Co | Mn | Al |
|---|---|---|---|---|---|
| Positive electrode material % | 6.98 | 0 | 56.89 | 0 | 1.23 |
| Leaching residue % | 0.05 | 0 | 45.12 | 21.20 | 1.08 |

Example 5

A method for selectively extracting lithium from a retired lithium manganate battery, the specific processes were as follows:

At S1, the retired lithium manganate battery was placed in a saturated brine for discharging, a positive electrode sheet was disassembled and separated and then dried, and the positive electrode sheet was crushed and sieved to obtain a lithium manganate positive electrode material.

At S2, 5 g of the positive electrode material and manganous chloride were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of 5° C./min at 250° C. for 5 h to obtain a calcined product.

At S4, the calcined product was mixed with deionized water at a solid-to-liquid ratio of 200 g/L, and stirred for 30 min, then filtered and washed to obtain 0.071 L of lithium-rich leaching solution and 6.17 g of leaching residue. The lithium-rich leaching solution had a lithium concentration of 2.63 g/L, and a manganese concentration of 0.095 g/L. No nickel, cobalt and aluminum had been detected.

The positive electrode material and the leaching residue in this example were detected by an inductively coupled plasma optical emission spectrometer (ICP-OES) and an atomic absorption spectrophotometer. The detection result was shown in Table 5. Wherein, the leaching rate of lithium= (volume of leaching solution*lithium concentration)/(mass of leaching material*lithium content)*100%, the selectivity of lithium=(volume of leaching solution*lithium concentration)/(volume of leaching solution*(lithium concentration+ nickel concentration+cobalt concentration+manganese concentration+aluminum concentration))*100%, the leaching rate of lithium in step S4 was calculated to be 90.6%, and the selectivity of lithium was 96.5%. The lithium-rich leaching solution can be used to prepare various lithium salts after being enriched. The leaching residue in step S4 was analyzed by an X-ray diffractometer (XRD), and the main phases were oxides of manganese. The leaching residue can be used to prepare various transition metal salts after being acid dissolved and separated.

TABLE 5

Composition of positive electrode material and leaching residue of Example 5

| Element | Li | Ni | Co | Mn | Al |
|---|---|---|---|---|---|
| Positive electrode material % | 4.12 | 0 | 0 | 62.50 | 0.21 |
| Leaching residue % | 0.30 | 0 | 0 | 72.89 | 0.12 |

Example 6

A method for selectively extracting lithium from a retired lithium manganate battery, the specific processes were as follows:

At S1, the retired lithium manganate battery was placed in a saturated brine for discharging, a positive electrode sheet was disassembled and separated and then dried, and the positive electrode sheet was crushed and sieved to obtain a lithium manganate positive electrode material.

At S2, 5 g of the positive electrode material and manganous chloride were mixed at a molar ratio of lithium ions to manganese ions of 1:1, and 2.5 mol/L of dilute sulfuric acid was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of at 250° C. for 5 h to obtain a calcined product.

At S4, the calcined product was mixed with deionized water at a solid-to-liquid ratio of 200 g/L, and stirred for 30 min, then filtered and washed to obtain 0.069 L of lithium-rich leaching solution and 5.62 g of leaching residue. The lithium-rich leaching solution had a lithium concentration of 2.63 g/L, a nickel concentration of 0.016 g/L, and a manganese concentration of g/L. No cobalt and aluminum had been detected.

The positive electrode material and the leaching residue in this example were detected by an inductively coupled plasma optical emission spectrometer (ICP-OES) and an atomic absorption spectrophotometer. The detection result was shown in Table 6. Wherein, the leaching rate of lithium= (volume of leaching solution*lithium concentration)/(mass of leaching material*lithium content)*100%, the selectivity of lithium=(volume of leaching solution*lithium concentration)/(volume of leaching solution*(lithium concentration+ nickel concentration+cobalt concentration+manganese concentration+aluminum concentration))*100%, the leaching rate of lithium in step S4 was calculated to be 91.5%, and the selectivity of lithium was 95.4%. The lithium-rich leaching solution can be used to prepare various lithium salts after being enriched. The leaching residue in step S4 was analyzed by an X-ray diffractometer (XRD), and the main phases were oxides of manganese. The leaching residue can be used to prepare various transition metal salts after being acid dissolved and separated.

TABLE 6

Composition of positive electrode material
and leaching residue of Example 6

| Element | Li | Ni | Co | Mn | Al |
|---|---|---|---|---|---|
| Positive electrode material % | 3.96 | 0 | 0 | 65.50 | 0.27 |
| Leaching residue % | 0.29 | 0 | 0 | 71.53 | 0.11 |

Comparative Example 1

A method for selectively extracting lithium from a retired 811-type lithium nickel cobalt manganate battery is provided, which has a difference from Example 3 mainly that the ball milled mixed material was not calcined. The specific processes were as follows.

At S1, the retired 811-type lithium nickel cobalt manganate battery was placed in a saturated brine for discharging, a positive electrode sheet was disassembled and separated and then dried, and the positive electrode sheet was crushed and sieved to obtain an 811-type lithium nickel cobalt manganate positive electrode material.

At S2, 5 g of the positive electrode material and manganous chloride were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was mixed with deionized water at a solid-to-liquid ratio of 200 g/L, and stirred for 30 min, then filtered and washed to obtain 0.056 L of lithium-rich leaching solution and a leaching residue. The lithium-rich leaching solution had a lithium concentration of 1.52 g/L, a manganese concentration of 1.09 g/L, and a nickel concentration of 0.03 g/L. No cobalt and aluminum had been detected.

The positive electrode material and the leaching residue in this comparative example were detected by an inductively coupled plasma optical emission spectrometer (ICP-OES) and an atomic absorption spectrophotometer. The detection result was shown in Table 7. Wherein, the leaching rate of lithium=(volume of leaching solution*lithium concentration)/(mass of leaching material*lithium content)*100%, the leaching rate of lithium in step S3 was calculated to be 23.6%.

TABLE 7

Composition of positive electrode material and
leaching residue of Comparative Example 1

| Element | Li | Ni | Co | Mn | Al |
|---|---|---|---|---|---|
| Positive electrode material % | 7.20 | 39.58 | 5.08 | 4.97 | 0.69 |
| Leaching residue % | 5.69 | 41.58 | 6.21 | 5.21 | 0.63 |

It can be seen from the extremely low leaching rate of this comparative example that, if the ball milled mixed material is not calcined, the replacement effect will be greatly reduced. Therefore, the solution of the present disclosure must be ball milled firstly to destroy the lattice structure of the positive electrode material, thereby reducing the activation energy of the the exchange of manganous ions and lithium ions. Then the calcining is performed at a lower temperature, such that the divalent manganese of the manganous salt occupies the position of lithium in the structure of the positive electrode material to directly perform a manganese-lithium replacement, which can be seen that the steps of ball milling and calcining are indispensable.

Comparative Example 2

A method for selectively extracting lithium from a retired lithium iron phosphate battery is provided, which has a difference from Example 3 was mainly that the positive electrode material was different. The specific processes were as follows:

At S1, the retired lithium iron phosphate battery was placed in a saturated brine for discharging, a positive electrode sheet was disassembled and separated and then dried, and the positive electrode sheet was crushed and sieved to obtain a lithium iron phosphate positive electrode material.

At S2, 5 g of the positive electrode material and manganous sulfate were mixed at a molar ratio of lithium ions to manganese ions of 2:1, and deionized water was added at a solid-to-liquid ratio of 1000 g/L. After throughly grinding to prepare a viscous slurry, the slurry was ball milled at a ball-to-material ratio of 10:1 and a rotation speed of 300 rpm for 2 h, to obtain a ball milled mixed material.

At S3, the ball milled mixed material was calcined in a muffle furnace at a heating rate of 5° C./min at 250° C. for 5 h to obtain a calcined product.

At S4, the calcined product was mixed with deionized water at a solid-to-liquid ratio of 200 g/L, and stirred for 30 min, then filtered and washed to obtain 0.062 L of lithium leaching solution and leaching residue. The lithium leaching solution had a lithium concentration of 0.59 g/L and an iron concentration of 0.05 g/L.

The positive electrode material and the leaching residue in this example were detected by an inductively coupled plasma optical emission spectrometer (ICP-OES) and an atomic absorption spectrophotometer. The detection result was shown in Table 8. Wherein, the leaching rate of lithium= (volume of leaching solution*lithium concentration)/(mass of leaching material*lithium content)*100%, the leaching rate of lithium in step S3 was calculated to be 17.65%.

TABLE 8

Composition of positive electrode material and
leaching residue of Comparative Example 2

| Element | Li | Fe | P | Al |
|---|---|---|---|---|
| Positive electrode material % | 4.13 | 31.5 | 22.6 | 1.57 |
| Leaching residue % | 2.89 | 25.66 | 19.87 | 1.46 |

The leaching rate of this comparative example is very low, which is because lithium iron phosphate had an olivine structure, while the positive electrode material selected in the present disclosure has a layered structure. The principle of the present disclosure is that the divalent manganese of the manganous salt occupies the position of lithium in the layered structure to directly perform the manganese-lithium replacement to obtain a pure lithium-containing leaching solution. Whereas, the structure and composition of lithium iron phosphate are different from that of the positive electrode material of the present disclosure, resulting in a great difference between the physicochemical properties of the two. Comparative Example 2 uses the present method for lithium extraction from lithium iron phosphate, however, due to the structural difference and different replacement mechanism, divalent manganese cannot directly occupy the position of lithium in the structure of lithium iron phosphate for replacement. Instead, the divalent manganese replaces the divalent iron in lithium iron phosphate and causes the deintercalation of lithium at the same time, thus, an iron-lithium mixed leaching solution is finally obtained. Besides, the replacement in lithium iron phosphate has a higher energy barrier, while the low-temperature calcination of the present method cannot provide sufficient energy. From this indicated that the method of the present disclosure is only suitable for positive electrode materials with a layered structure, and not suitable for lithium iron phosphate with an olivine structure. If the positive electrode material of the present disclosure is replaced with lithium iron phosphate, the objective of the present disclosure will not be achieved.

The embodiments of the present disclosure are described in detail above with reference to the accompanying drawings, but the present disclosure is not limited to the above-mentioned embodiments, and various changes can be made without departing from the purpose of the present disclosure within the scope of knowledge possessed by those of ordinary skill in the art. In addition, embodiments in the present disclosure and features in the embodiments can be combined with each other under the premise of no conflict.

What is claimed is:

1. A method for selectively extracting lithium from a retired battery, consisting essentially of the following steps:
   S1: mixing a lithium battery positive electrode material and a manganous salt, adding a solvent to prepare a slurry, and ball milling the slurry to obtain a ball milled mixed material; wherein the lithium battery positive electrode material is at least one of lithium manganate, lithium cobaltate, lithium nickel cobalt manganate or lithium nickel cobalt aluminate battery positive electrode materials; and, the manganous salt is at least one of manganous sulfate, manganous chloride, manganous nitrate, manganous phosphate, manganous acetate, manganous oxalate, or manganous acetylacetonate;
   S2: calcining the ball milled mixed material to obtain a calcined product; and
   S3: adding the calcined product into a leaching agent for leaching to obtain a lithium-rich leaching solution; wherein the leaching agent is at least one of water, carbonic acid solution, sulfuric acid solution, hydrochloric acid solution, or sodium hydroxide solution,
   wherein in step S1, the solvent is water; and the positive electrode material has a layered structure.

2. The method according to claim 1, wherein in step S1, a solid-to-liquid ratio of the slurry is 500 g/L to 5000 g/L.

3. The method according to claim 1, wherein in step S1, a molar ratio of manganese ions in the manganous salt to lithium ions in the positive electrode material is 0.1-2:1.

4. The method according to claim 1, wherein in step S1, a ball-to-material ratio of the ball milling is 1-100:1, a rotation speed of the ball milling is 200 rpm to 1200 rpm, and a time for the ball milling is 0.5 h to 8 h.

5. The method according to claim 1, wherein in step S2, a temperature of the calcining is 200° C. to 800° C., a heating rate is 1° C./min to 20° C./min, and a time for calcining is 1 h to 12 h.

* * * * *